(12) United States Patent
Aihara

(10) Patent No.: US 8,834,036 B2
(45) Date of Patent: Sep. 16, 2014

(54) OPTICAL COUPLING STRUCTURE, AND OPTICAL COUPLING STRUCTURE ASSEMBLY METHOD

(75) Inventor: Shuichi Aihara, Shibuya-ku (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 112 days.

(21) Appl. No.: 13/643,839

(22) PCT Filed: May 23, 2011

(86) PCT No.: PCT/JP2011/061758
§ 371 (c)(1),
(2), (4) Date: Oct. 26, 2012

(87) PCT Pub. No.: WO2011/158610
PCT Pub. Date: Dec. 22, 2011

(65) Prior Publication Data
US 2013/0039621 A1    Feb. 14, 2013

(30) Foreign Application Priority Data

Jun. 18, 2010 (JP) ................................. 2010-139745

(51) Int. Cl.
| G02B 6/38 | (2006.01) |
| G02B 6/36 | (2006.01) |
| G02B 6/32 | (2006.01) |
| G02B 6/42 | (2006.01) |

(52) U.S. Cl.
CPC .............. *G02B 6/322* (2013.01); *G02B 6/3636* (2013.01); *G02B 6/4204* (2013.01); *G02B 6/327* (2013.01)
USPC ................... 385/62; 385/61; 385/65; 385/72; 385/74; 385/79; 385/81; 385/83; 385/93

(58) Field of Classification Search
CPC .. G02B 6/3855; G02B 6/3834; G02B 6/3838; G02B 6/3857; G02B 6/3858

USPC ............ 385/61, 62, 65, 72, 74, 79, 81, 83, 93
See application file for complete search history.

(56) References Cited

U.S. PATENT DOCUMENTS

| 4,720,632 A | 1/1988 | Kaneko |
| 6,226,437 B1 | 5/2001 | Kikuchi et al. |

(Continued)

FOREIGN PATENT DOCUMENTS

| CN | 101228466 | 7/2008 |
| JP | 61-175604 | 8/1986 |

(Continued)

OTHER PUBLICATIONS

International Search Report, mail date is Jul. 19, 2011.

(Continued)

*Primary Examiner* — Ryan Lepisto
*Assistant Examiner* — Robert Tavlykaev
(74) *Attorney, Agent, or Firm* — Greenblum & Bernstein, P.L.C.

(57) ABSTRACT

An optical coupling structure of the present invention is configured with a lens body and a clamp. The lens body includes a lens section having the lens and a fixing section. The clamp includes a positioning section, a pressing spring, and a retaining section. The positioning section determines a position of the clamp except a position in a direction of the optical axis of the optical fiber. The pressing spring makes contact with a surface of the lens body having a normal direction matching with the end face of the optical fiber, and generates a returning force when the clamp moves in a direction opposite to the normal direction of the surface. The retaining section is formed in a portion of the clamp to press the optical fiber and retains the optical fiber not to move in a direction apart from the lens.

17 Claims, 17 Drawing Sheets

(56) References Cited

U.S. PATENT DOCUMENTS

| | | | |
|---|---|---|---|
| 8,079,125 B2 * | 12/2011 | Ban et al. ................ | 29/407.09 |
| 2006/0245694 A1 | 11/2006 | Chen et al. | |
| 2009/0154884 A1 | 6/2009 | Chen et al. | |

FOREIGN PATENT DOCUMENTS

| | | |
|---|---|---|
| JP | 2000-028866 | 1/2000 |
| JP | 2007-041222 | 2/2007 |
| JP | 2007-187928 | 7/2007 |
| JP | 2008-535037 | 8/2008 |
| WO | 2006-108024 | 10/2006 |

OTHER PUBLICATIONS

Japan Office action, dated Jul. 12, 2011 along with an english translation thereof.

Office Action from Chinese Patent Office, dated May 6, 2014, along with an English translation thereof.

* cited by examiner

OPTICAL COUPLING STRUCTURE, AND OPTICAL COUPLING STRUCTURE ASSEMBLY METHOD

TECHNICAL FIELD

The present invention relates to an optical coupling structure to optically couple a lens and an optical fiber and to a method of assembling an optical coupling structure.

BACKGROUND ART

As a technique to optically couple a lens and an optical fiber, there is a method using an adhesive. As one of such techniques, there is a technique described in Patent literature 1, for example. In the technique described in Patent literature 1, an optical fiber is aligned using a pressing plate for a lens member (lens+guide groove) and is fixed with an adhesive. FIGS. 1A and 1B indicate FIG. 1 in Patent literature 1, and FIG. 1A is a perspective view of an optical coupling structure illustrated in Patent literature 1 and FIG. 1B is a cross-sectional view of the optical coupling structure illustrated in Patent literature 1. In the drawings, 1A denotes an optical coupling structure, 2A denotes a lens member, 3A denotes a lens formation section, 4A denotes a fiber retaining section, 5A denotes a collimator lens, 6A denotes a fiber guide groove, 7 denotes a pressing lid, 8 denotes an adhesive, 20 denotes an optical fiber, and 20a denotes a core.

PRIOR ART LITERATURE

Patent Literature

Patent literature 1: Japanese Patent Application Laid Open No. 2007-41222

SUMMARY OF THE INVENTION

Problems to be Solved by the Invention

However, in many of the methods using an adhesive, such as Patent literature 1, a gap is prone to occur between a lens and an end face of an optical fiber. For example, even when there used to be no gap at the time of manufacture, there is no force to press an optical fiber against a lens or the pressing force cannot be maintained, so that there is a possibility of occurring a gap caused by contraction due to a temperature change. In addition, since an adhesive is used, processing for curing an adhesive and a time for the processing are required. Accordingly, assembly steps become complex.

It is an object of the present invention to provide an optical coupling structure that has simple assembly steps and maintains a force to press an end face of an optical fiber against a lens even after the manufacture.

Means to Solve the Problems

An optical coupling structure of the present invention is configured with a lens body and a clamp. The lens body comprises a lens section having the lens and a fixing section. The fixing section is formed integrally with the lens section, and has an optical fiber guide, when the optical fiber is pressed, positioning an optical axis of the optical fiber at a predetermined position of the lens. The clamp comprises a positioning section, a pressing spring, and a retaining section. The positioning section determines a position of the clamp relative to the lens body except a position in a direction of the optical axis of the optical fiber. The pressing spring makes contact with a surface of the lens body having a normal direction matching with the end face of the optical fiber, and generates a returning force when the clamp moves in a direction opposite to the normal direction of the surface. The retaining section is formed in a portion of the clamp to press the optical fiber and retains the optical fiber not to move in a direction apart from the lens. The retaining section may also be a nail extending in a direction inside of the clamp and in a direction of the optical fiber getting closer to the lens and be a fixing nail having its tip at a position pressing the optical fiber against the optical fiber guide. The retaining section may also be a rough surface having concavity and convexity. The "normal direction of the surface" means a direction from inside towards outside of a solid forming the surface. That is, "having a normal direction matching" above means to match the directions of a normal vector from inside towards outside of the end face of the optical fiber and a normal vector from inside towards outside of the lens body. The opposite direction means that the directions of normal vectors are opposite.

Effects of the Invention

According to an optical coupling structure of the present invention, an optical fiber is positioned by an optical fiber guide and a retaining section for a direction vertical to an optical axis. The retaining section retains the optical fiber not to move in a direction apart from the lens. Accordingly, as the optical fiber is about to move in a direction apart from the lens, it turns out to move together with a clamp, so that a pressing spring generates a returning force. In a case that an optical fiber is set to press a lens at the time of manufacture, the pressing force is maintained even after the manufacture. Since the optical coupling structure of the present invention may not use an adhesive, the assembly steps are simple. Even when additionally using an adhesive, the optical coupling structure of the present invention fixes an optical fiber and a lens, so that it is not required to wait for curing of the adhesive, and thus the assembly steps are simple.

DETAILED DESCRIPTION OF THE EMBODIMENTS

A detailed description is given below to embodiments of the present invention. A same numeral is given to components having a same function to omit repetitive descriptions.

First Embodiment

Figure 1A:
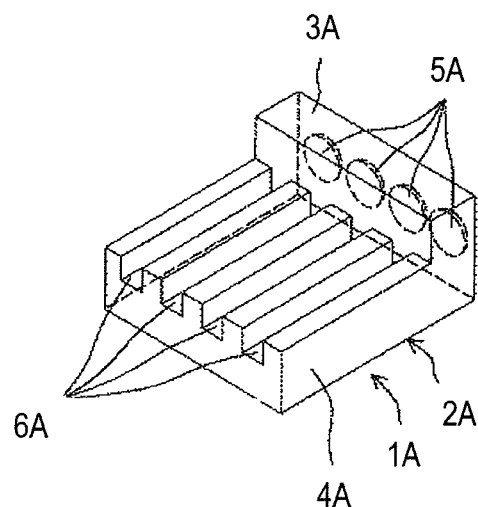
FIG. 1A is a perspective view of an optical coupling structure illustrated in Patent literature 1.
Figure 1B:
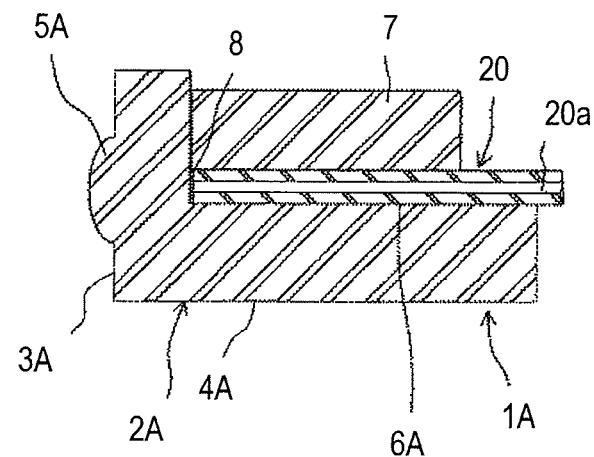
FIG. 1B is a cross-sectional view of the optical coupling structure illustrated in Patent literature 1.
Figure 2:
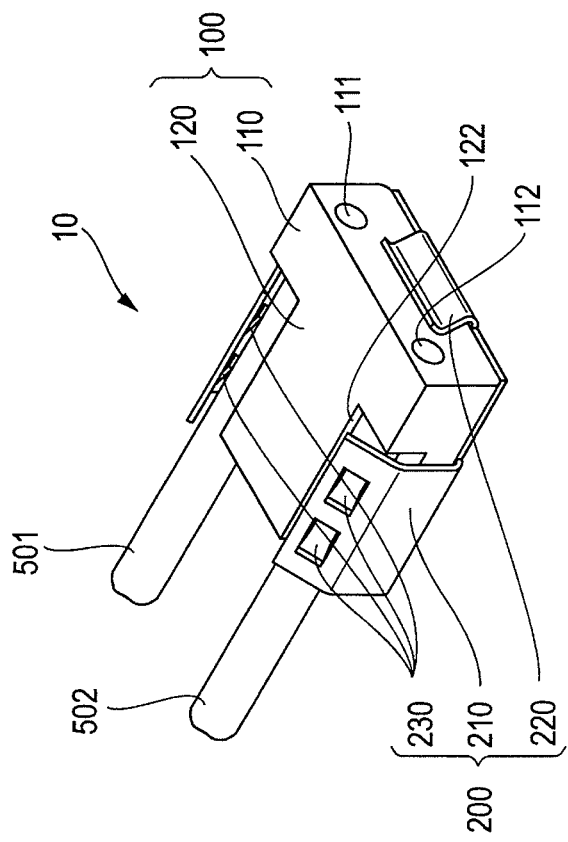
FIG. 2 is a perspective view of an optical coupling structure in First Embodiment.
Figure 3A:
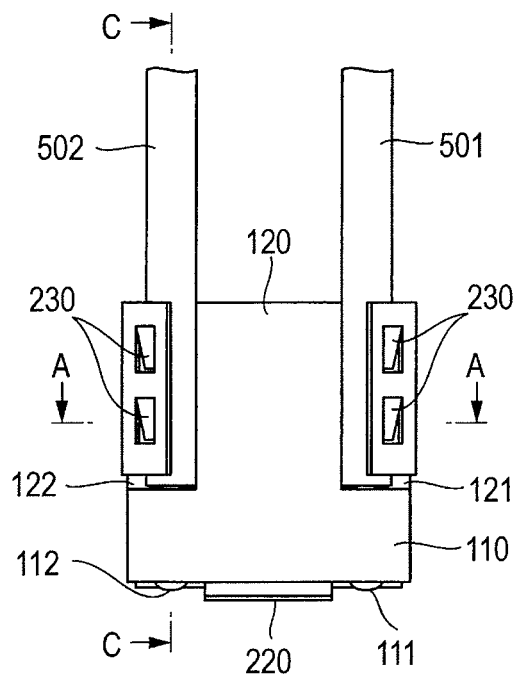
FIG. 3A is a plan view of the optical coupling structure in First Embodiment.
Figure 3B:
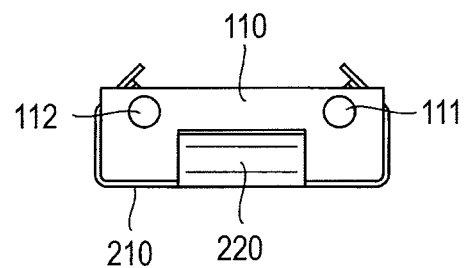
FIG. 3B is a front view of the optical coupling structure in First Embodiment.
Figure 3C:
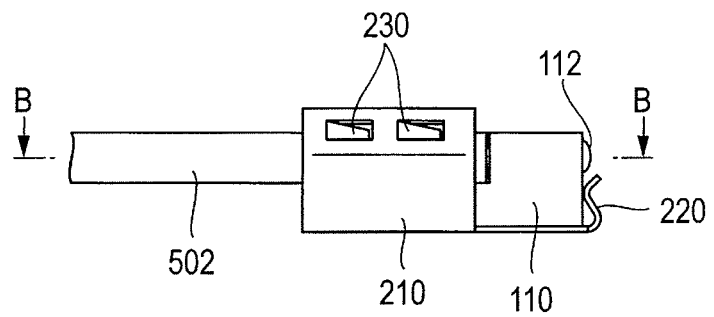
FIG. 3C is a left side view of the optical coupling structure in First Embodiment.
Figure 4:
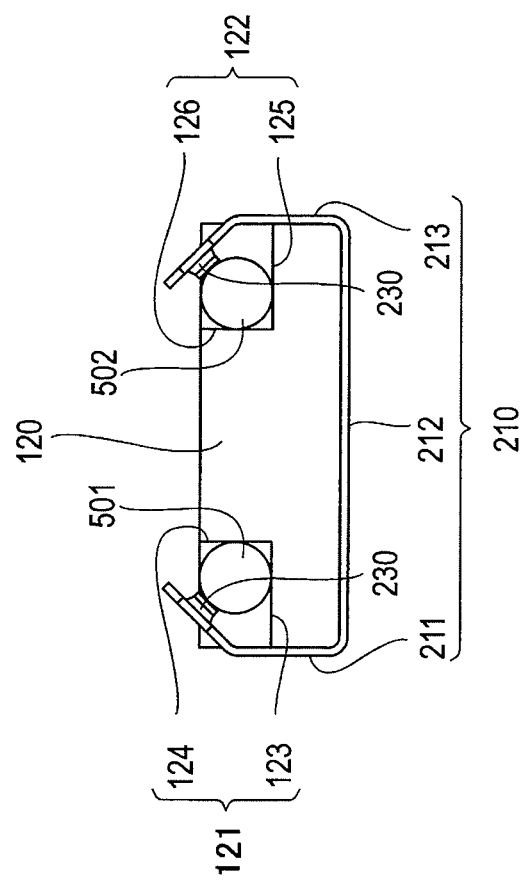
FIG. 4 is a cross-sectional view cut along an A-A line in FIG. 3A.
Figure 5:
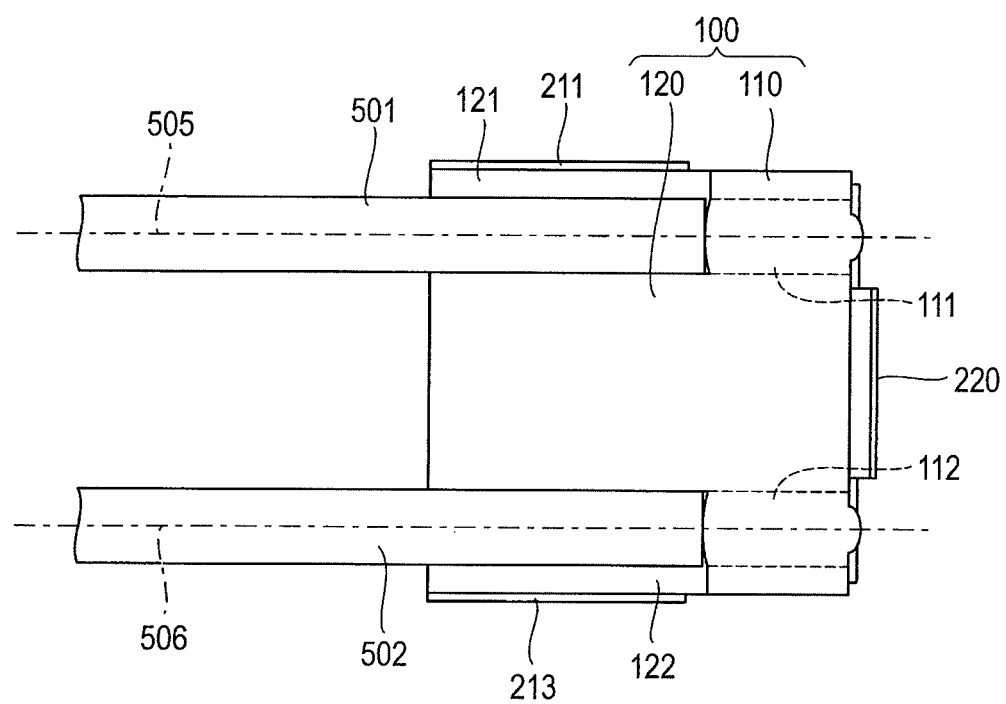
FIG. 5 is a cross-sectional view cut along a B-B line in FIG. 3C.
Figure 6:
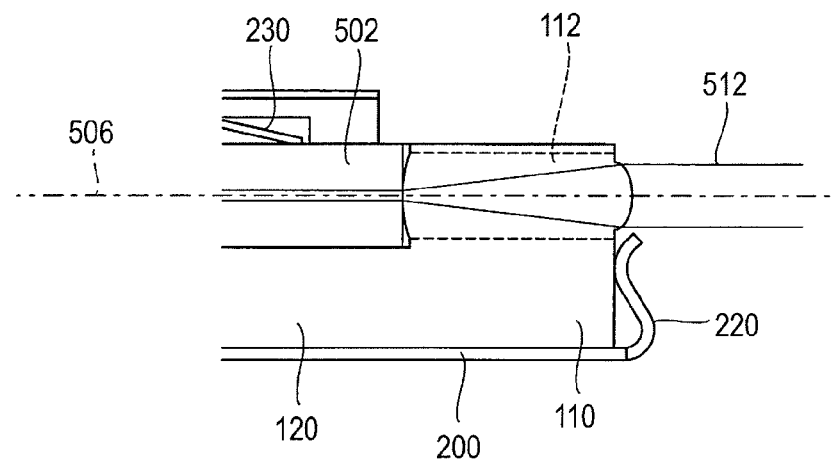
FIG. 6 is a cross-sectional view cut along a C-C line in FIG. 3A, illustrating a state of optical coupling.
Figure 7:
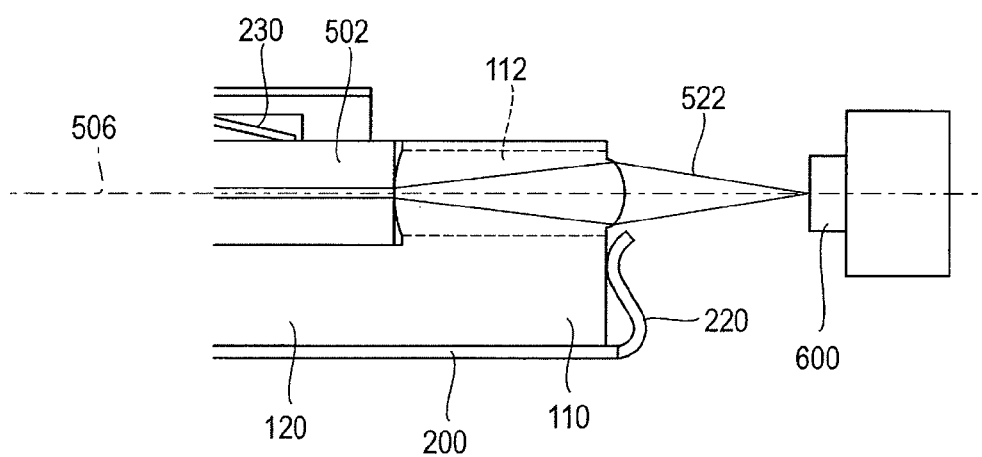
FIG. 7 is a cross-sectional view cut along a C-C line in FIG. 3A, illustrating another state of optical coupling.

FIG. 2 is a perspective view of an optical coupling structure in First Embodiment, and FIGS. 3A, 3B and 3C show views of the optical coupling structure in First Embodiment taken from three directions. FIG. 3A is a plan view, FIG. 3B is a front view, and FIG. 3C is a left side view. FIG. 4 is a cross-sectional view cut along an A-A line in FIG. 3A, and FIG. 5 is a cross-sectional view cut along a B-B line in FIG. 3C. FIG. 6 is a cross-sectional view cut along a C-C line in FIG. 3A, illustrating a state of optical coupling. FIG. 7 is also a cross-sectional view cut along a C-C line in FIG. 3A, illustrating another state of optical coupling.

In an optical coupling structure in First Embodiment, two optical fibers are made contact physically with lenses. An optical coupling structure 10 is configured with a lens body 100 and a clamp 200. The lens body 100 comprises a lens section 110, having lenses 111 and 112, and a fixing section 120. The lenses 111 and 112 illustrated in these drawings are convex lenses. For example, the lenses may also have a flat surface making contact with the optical fibers and the optical fibers may also have a convex end face. When the entire lens body 100 or at least the entire lens section 110 is formed with an optical material same as that of the lenses, the region of the lenses is not definite. With that, a lens herein means a region having a possibility of transmitting a light in the lens section 110. That is, even when the lens is a plano-convex lens, not only the convex portion is called as a lens but the entire area from the flat portion to the convex portion is called as a lens. The portion surrounded by dotted lines in FIGS. 6 and 7 is equivalent to a lens. In the example of FIG. 6, the lens has a collimate function. In the example of FIG. 7, the lens has a light collecting function. Optical properties, such as a focal length, of the lens may be designed appropriately depending on the intended light coupling.

The fixing section 120 is formed integrally with the lens section 110 and has optical fiber guides 121 and 122 to position optical axes of the optical fibers 501 and 502 at predetermined positions of the lenses 111 and 112 when the optical fibers 501 and 502 are pressed. Specifically, each optical fiber guide 121 (122) comprises two guide surfaces 123 and 124 (125 and 126) forming a groove to have the optical fiber 501 (502) placed thereon. Then, by pressing the optical fiber 501 (502) against both of the two guide surfaces 123 and 124 (125 and 126), the optical axis of the optical fiber 501 (502) is positioned.

The clamp 200 is provided with a positioning section 210, a pressing spring 220, and fixing nails 230. The positioning section 210 determines a position of the clamp 200 relative to the lens body 100 except the direction of the optical axes of the optical fibers 501 and 502. For example, the positioning section 210 may be elastic and make contact with three or more surfaces of the fixing section 120 different in the normal directions from each other other than the optical fiber guides 121 and 122. In the example of FIG. 4, three contact sections 211, 212, and 213 make contact with three surfaces of the fixing section 120 having different normal directions from each other. The normal direction is a direction parallel to a normal of a surface, so that there could be two directions in general, while "a normal direction of a surface" herein means a direction from inside towards outside of a solid forming the surface.

To describe the example of the optical coupling structure illustrated in FIGS. 2 through 5 in a different expression, a cross section (cross section illustrated in FIG. 4) cut along a surface of the fixing section 120 vertical to the optical axes of the optical fibers is in a rectangular shape with V shaped grooves added thereto. These V shaped grooves are the optical fiber guides 121 and 122. Then, the positioning section 210 is elastic and makes contact with three or more surfaces of the fixing section 120 different in normal directions from each other except the V shaped groove.

The pressing spring 220 makes contact with a surface of the lens body 100 having a normal direction matching with that of the end faces of the optical fibers 501 and 502, and when the clamp 200 moves in a direction opposite to the normal direction of the surface, generates a returning force. That is, the pressing spring 220 binds the clamp 200 not to move the optical fibers 501 and 502 in a direction apart from the lenses 111 and 112. The fixing nails 230 are nails extending in a direction inside of the clamp 200 and also in a direction of the optical fibers 501 and 502 getting closer to the lenses 111 and 112, and have their tips at a position of pressing the optical fibers 501 and 502 against the optical fiber guides 121 and 122. That is, the fixing nails 230 press the optical fibers 501 and 502 against the optical fiber guides 121 and 122 and also bind not to move the optical fibers 501 and 502 in a direction apart from the lenses 111 and 112.

As seen above, by the pressing spring 220 and the fixing nails 230, the condition of pressing the optical fibers 501 and 502 against the lenses 111 and 112 is maintained. Depending on to what extent the returning force is given to the pressing spring 220 at the time of manufacture, the force to press the optical fibers 501 and 502 against the lenses 111 and 112 can be adjusted. Further, the spring constant and the displaceable range of the pressing spring 220 may be designed to always allow maintenance of a pressing force at a target value or more reviewing the temperature change and the applied vibration based on the environment of using the optical coupling structure 10.

According to the optical coupling structure of the present invention, the optical fibers 501 and 502 are positioned by the optical fiber guides 121 and 122 and the fixing nails 230 for a direction vertical to the optical axis. The fixing nails 230 extend in a direction of the optical fibers 501 and 502 getting closer to the lenses 111 and 112. Accordingly, as the optical fibers 501 and 502 are about to move in a direction apart from the lenses 111 and 112, it turns out to move together with a clamp 200, so that the pressing spring 220 generates a returning force. In a case that the optical fibers 501 and 502 are set to press the lenses 111 and 112 at the time of manufacture, the pressing force is maintained even after the manufacture. Since the optical coupling structure of the present invention is not required to use an adhesive, the assembly steps are simple. It is also allowed to additionally use an adhesive, for example, at the end of the assembly steps. Even in this case, the optical fibers 501 and 502 and the lenses 111 and 112 are fixed by the optical coupling structure of the present invention, so that it is not required to fix the optical fibers 501 and 502 and the lenses 111 and 112 until the adhesive is cured.

[Assembly Method 1]

Figure 8A:
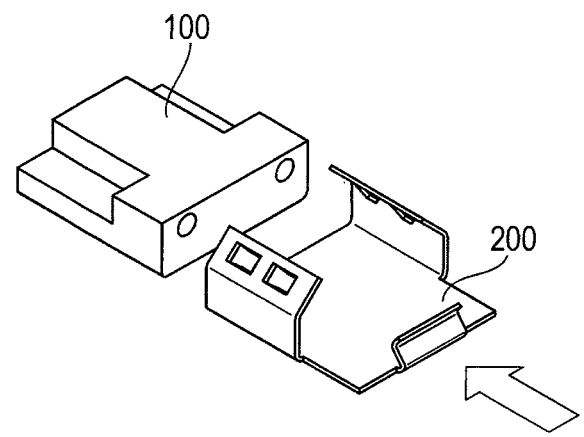
FIG. 8A is a drawing illustrating a step of fitting a lens body 100 into a clamp 200.
Figure 8B:
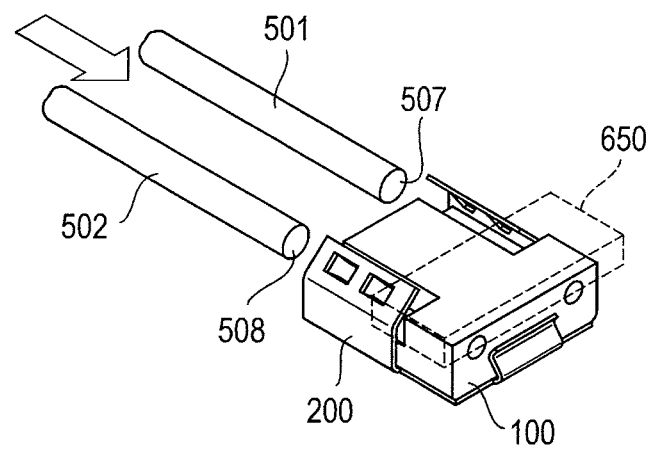
FIG. 8B is a drawing illustrating a step of inserting optical fibers 501 and 502 into an optical coupling structure 10.
Figure 9A:
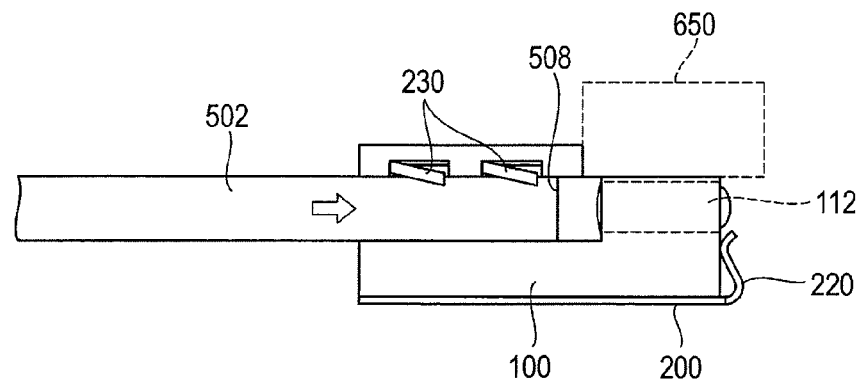
FIG. 9A is a cross-sectional view cut along a C-C line in FIG. 3A at the time of starting insertion of the optical fiber 502.
Figure 9B:
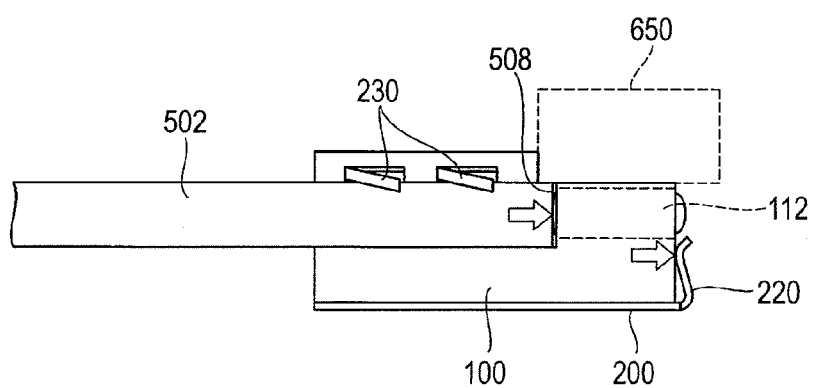
FIG. 9B is a cross-sectional view cut along a C-C line in FIG. 3A at the time of, after the optical fiber 502 makes contact with a lens 112, further pushing the optical fiber 502.
Figure 9C:
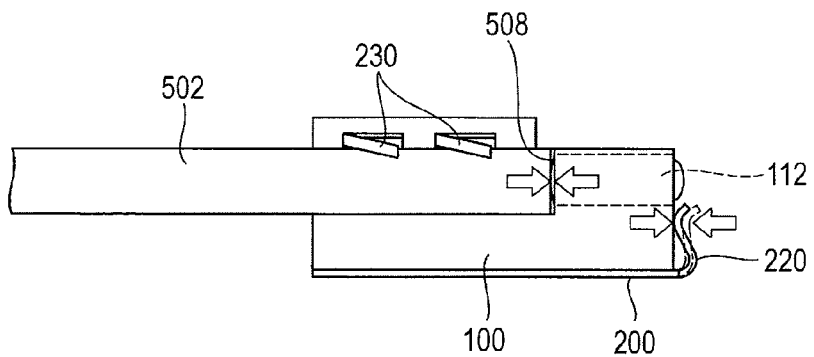
FIG. 9C is a cross-sectional view cut along a C-C line in FIG. 3A illustrating a condition of removing a clamp fixing jig 650.

FIGS. 8A, 8B, 9A, 9B and 9C illustrate an example of a method of assembling the optical coupling structure in First Embodiment. FIG. 8A illustrates a step of fitting the lens body 100 into the clamp 200. When the clamp 200 is elastic, the lens body 100 may be fitted while stretching around the fixing nails 230. FIG. 8B illustrates a step of inserting the optical fibers 501 and 502 into the optical coupling structure 10. In this step, the clamp 200 may be fixed by, for example, the clamp fixing jig 650 to insert the optical fibers 501 and 502. FIGS. 9A, 9B and 9C illustrate_the step of inserting the optical fibers in detail and illustrates cross sections taken from a C-C line in FIG. 3A. FIG. 9A is a drawing at the time of starting insertion of the optical fiber 502. FIG. 9B is a drawing at the time of, after the optical fiber 502 makes contact with a lens 112, further pushing the optical fiber 502. The clamp fixing jig 650 fixes the clamp 200 while it does not fix the lens body 100. Accordingly, the lens body 100 moves to the right in the drawing by being pushed by the optical fiber 502, and a returning force is generated in the pressing spring 220. FIG. 9C illustrates a condition of removing a clamp fixing jig 650. While the pressing spring 220 attempts to push back the lens body 100 and the optical fiber 502, the fixing nails 230 prevent the optical fiber 502 from moving to the left. Accordingly, an end face 508 of the optical fiber 502 becomes in a condition of being pressed against the lens 112.

[Assembly Method 2]

Figure 10:
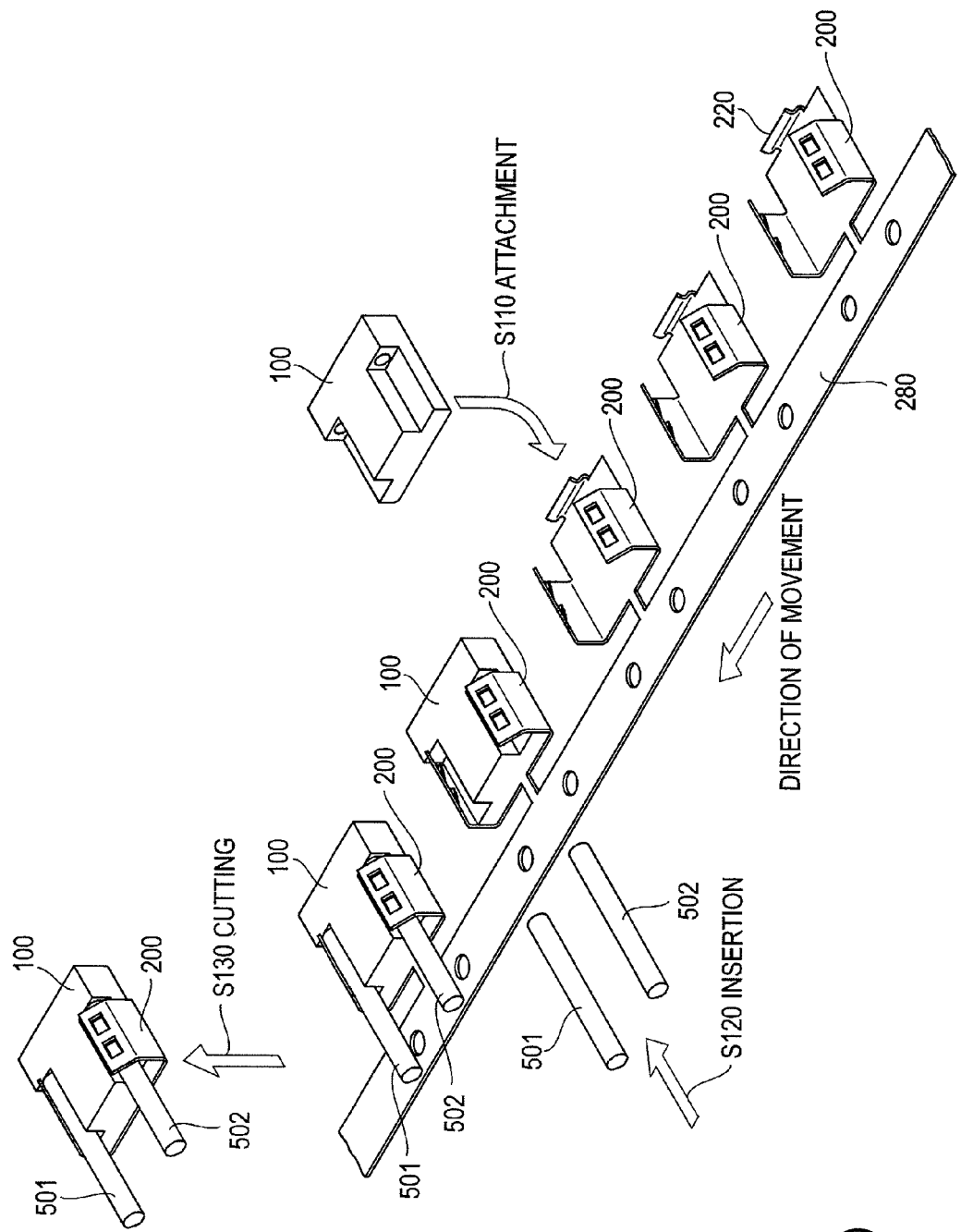
FIG. 10 is a drawing illustrating another example of a method of assembling an optical coupling structure of the present invention.

FIG. 10 illustrates another example of a method of assembling the optical coupling structure in First Embodiment. In this assembly method, the clamp 200 has a portion of a side opposite to the pressing spring 220 connected to a hoop material 280. The clamp 200 may be connected to the hoop material 280 using an adhesive or the like and the clamp 200 may also be manufactured integrally with the hoop material 280 by press processing. Then, while moving the clamp 200 using the hoop material 280, an optical coupling structure is assembled. Firstly, the lens body 100 is fitted into the clamp 200 at a certain position (S110: attachment step). At a position, the optical fibers 501 and 502 are inserted (S120: insertion step). The optical fibers 501 and 502 are pushed into with a predetermined force or to a predetermined position even after making contact with the lenses 111 and 112 in a same manner as in FIG. 9B. Whether to push into with a predetermined force or to push into to a predetermined position may be determined appropriately from manufacturing conditions. While the clamp fixing jig 650 fixes the clamp 200 in Assembly Method 1, the hoop material 280 plays a role of fixing the clamp 200 in Assembly Method 2. Even when the force to push the optical fibers 501 and 502 is released, the force to press the end faces of the optical fibers 501 and 502 against the lenses 111 and 112 is maintained by the pressing spring 220 and the fixing nails 230. Then, at a next position, a portion of connecting the clamp 200 and the hoop material 280 is cut to remove the clamp 200 from the hoop material 280 (S130: cutting step). Such assembly method facilitates assembly even of a compact optical coupling structure and enables assembly on a production line to be efficient.

[Modification]

Figure 11:
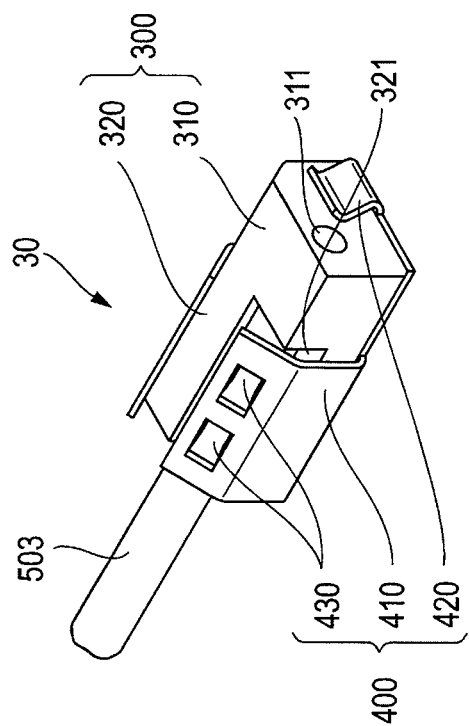
FIG. 11 is a perspective view of an optical coupling structure of a modification of First Embodiment.
Figure 12A:
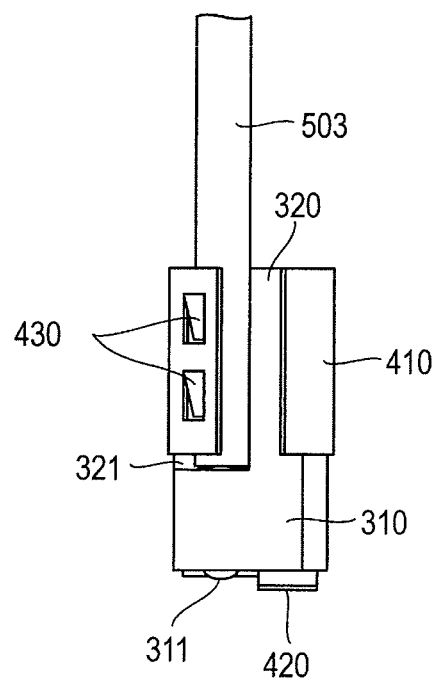
FIG. 12A is a plan view of the optical coupling structure of the modification of First Embodiment.
Figure 12B:
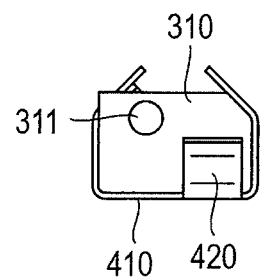
FIG. 12B is a front view of the optical coupling structure of the modification of First Embodiment.
Figure 12C:
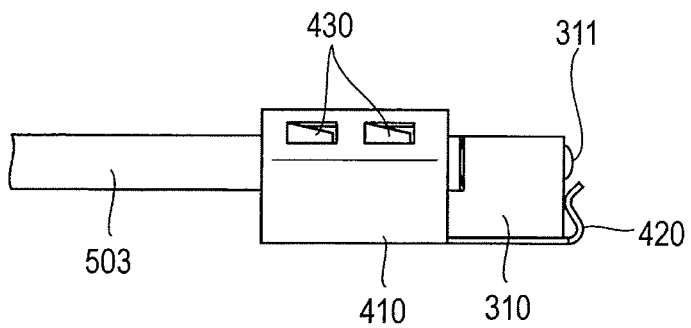
FIG. 12C is a left side view of the optical coupling structure of the modification of First Embodiment.

FIG. 11 is a perspective view of an optical coupling structure of a modification of First Embodiment, and FIGS. 12A, 12B and 12C show views of the optical coupling structure of the modification of First Embodiment taken from three directions. FIG. 12A is a plan view, FIG. 12B is a front view, and FIG. 12C is a left side view. The optical coupling structure of the present modification makes one optical fiber physically contact with a lens. An optical coupling structure 30 is configured with a lens body 300 and a clamp 400. The lens body 300 comprises a lens section 310 having a lens 311 and a fixing section 320. The approach for the structure and the region of the lens is same as that in First Embodiment.

The fixing section 320 is formed integrally with the lens section 310 and has an optical fiber guide 321 to position an optical axis of an optical fiber 503 at a predetermined position of the lens 311 when the optical fiber 503 is pressed. Specifically, in a same manner as First Embodiment, the optical fiber guide 321 comprises two guide surfaces (not shown) forming a groove to have the optical fiber 503 placed thereon, and by pressing the optical fiber 503 against both of the two guide surfaces, the optical axis of the optical fiber 503 is positioned.

The clamp 400 is provided with a positioning section 410, a pressing spring 420, and fixing nails 430. The positioning section 410 determines a position of the clamp 400 relative to the lens body 300 except the direction of the optical axis of the optical fiber 503. For example, in a same manner as First Embodiment, the positioning section 410 is elastic and makes contact with three or more surfaces of the fixing section 320 different in the normal directions from each other other than the optical fiber guide 321.

The pressing spring 420 makes contact with a surface of the lens body 300 having a normal direction matching with that of the end face of the optical fiber 503, and when the clamp 400 moves in a direction opposite to the normal direction of the surface, generates a returning force. That is, the pressing spring 420 binds the clamp 400 not to move the optical fiber 503 in a direction apart from the lens 311. The fixing nails 430 are nails extending in a direction inside of the clamp 400 and also in a direction of the optical fiber 503 getting closer to the lens 311, and have their tips at a position of pressing the optical fiber 503 against the optical fiber guide 321. That is, the fixing nails 430 press the optical fiber 503 against the optical fiber guide 321 and also bind the optical fiber 503 not to move the optical fiber 503 in a direction apart from the lens 311.

Since the optical coupling structure of the present modification has such a structure, effects same as those of First Embodiment are obtained. Both methods of Assembly Method 1 and Assembly Method 2 shown in First Embodiment can be used.

Second Embodiment

Figure 13:
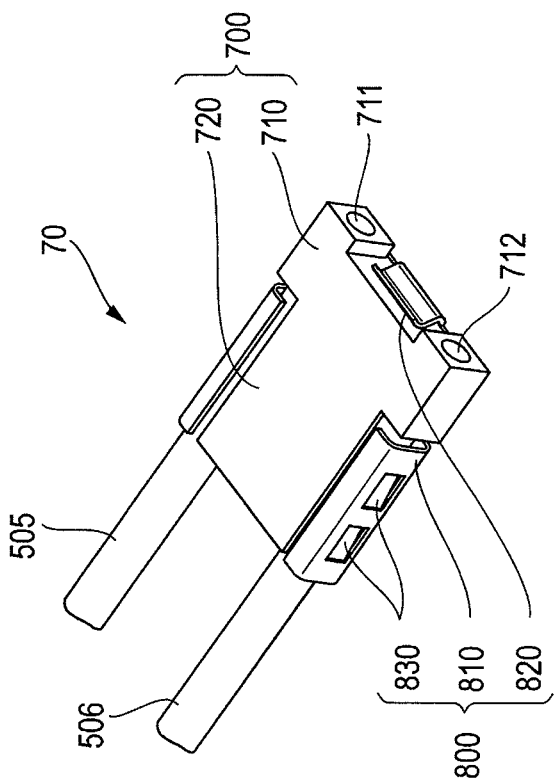
FIG. 13 is a perspective view of an optical coupling structure in Second Embodiment.
Figure 14A:
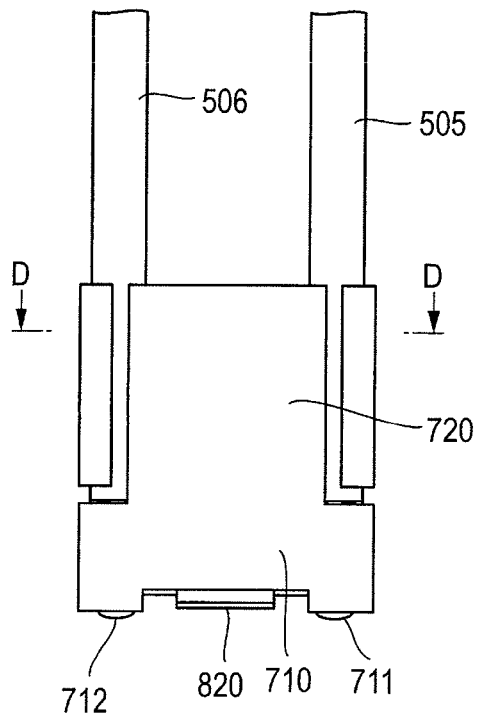
FIG. 14A is a plan view of the optical coupling structure in Second Embodiment.
Figure 14B:
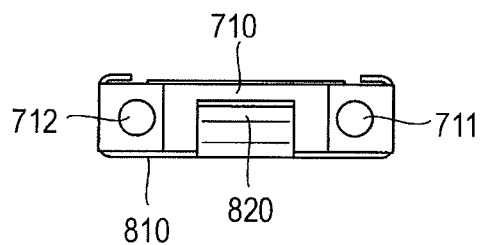
FIG. 14B is a front view of the optical coupling structure in Second Embodiment.
Figure 14C:
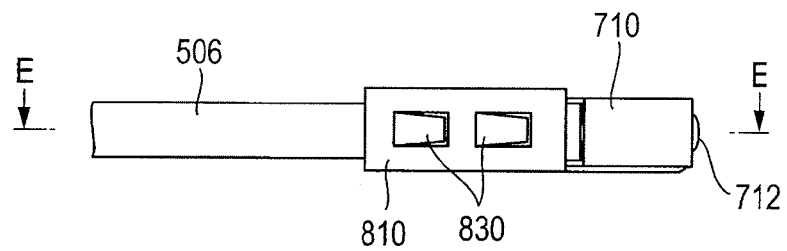
FIG. 14C is a left side view of the optical coupling structure in Second Embodiment.
Figure 15:
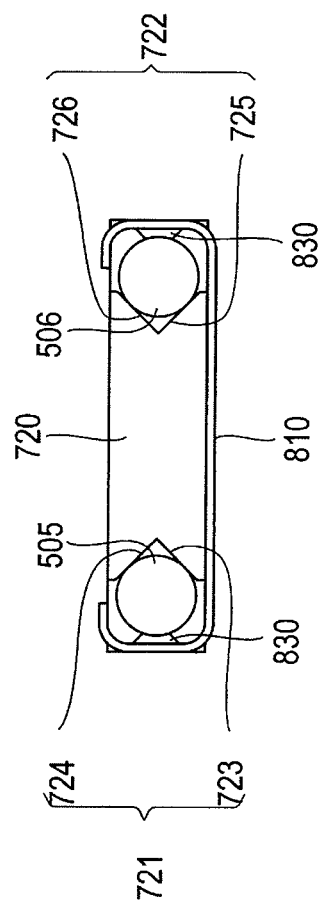
FIG. 15 is a cross-sectional view cut along a D-D line in FIG. 14A.
Figure 16:
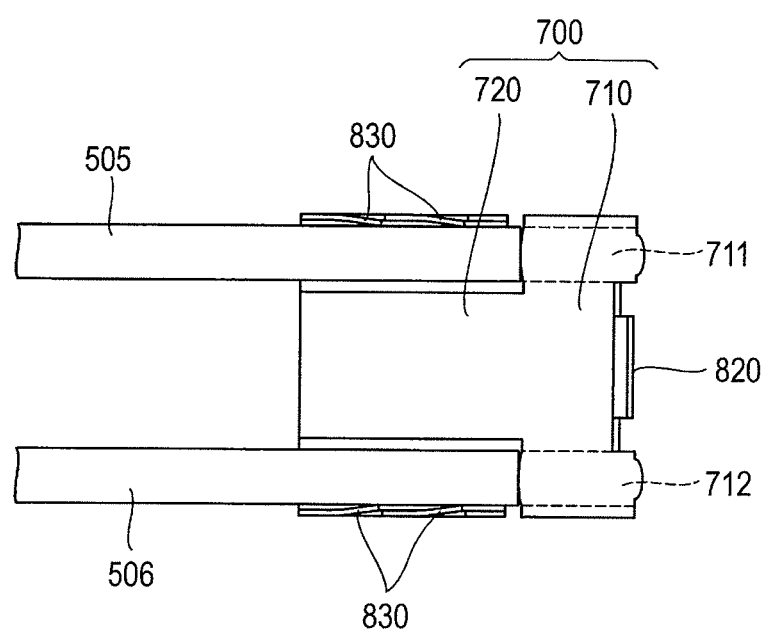
FIG. 16 is a cross-sectional view cut along an E-E line in FIG. 14C.

FIG. 13 is a perspective view of an optical coupling structure in Second Embodiment, and FIGS. 14A, 14B and 14C show views of an optical coupling structure in Second Embodiment taken from three directions. FIG. 14A is a plan view, FIG. 14B is a front view, and FIG. 14C is a left side view. FIG. 15 is a cross-sectional view cut along a D-D line in FIG. 14A. FIG. 16 is a cross-sectional view cut along an E-E line in FIG. 14C.

In an optical coupling structure in Second Embodiment, two optical fibers are made contact physically with lenses. An optical coupling structure 70 is configured with a lens body 700 and a clamp 800. The lens body 700 comprises a lens section 710, having lenses 711 and 712, and a fixing section 720. The structure, functions, and the like of the lenses 711 and 712 are same as the lenses 111 and 112 in First Embodiment and the optical properties may be designed appropriately depending on the intended light coupling.

The fixing section 720 is formed integrally with the lens section 710 and has optical fiber guides 721 and 722 to position optical axes of the optical fibers 505 and 506 at predetermined positions of the lenses 711 and 712 when the optical fibers 505 and 506 are pressed. Specifically, each optical fiber guide 721 (722) comprises two guide surfaces 723 and 724 (725 and 726) forming a groove to have the optical fiber 505 (506) placed thereon. Then, by pressing the optical fiber 505 (506) against both of the two guide surfaces 723 and 724 (725 and 726), the optical axis of the optical fiber 505 (506) is positioned.

The clamp 800 is provided with a positioning section 810, a pressing spring 820, and fixing nails 830. The positioning section 810 determines a position of the clamp 800 relative to the lens body 700 except the direction of the optical axes of the optical fibers 505 and 506.

The example of the optical coupling structure illustrated in FIGS. 13 through 16 is described in a different expression. The fixing section 720 has a cross section (cross section illustrated in FIG. 15) cut along a surface vertical to the optical axes of the optical fibers is in a rectangular shape with respective V shaped grooves added thereto on two facing sides of the rectangle. These V shaped grooves are the optical fiber guides 721 and 722. Then, the fixing nails 830 press the optical fibers 505 and 506 against the optical fiber guides 721 and 722 by pressing the two optical fibers 505 and 506 to sandwich the fixing section 720. The positioning section 810 is elastic and makes contact with at least one of the surfaces of the fixing section 720 without the V shaped grooves. It may also make contact with both surfaces of the fixing section 720 without the V shaped grooves.

The pressing spring 820 makes contact with a surface of the lens body 700 having a normal direction matching with that of the end faces of the optical fibers 505 and 506, and when the clamp 800 moves in a direction opposite to the normal direction of the surface, generates a returning force. That is, the pressing spring 820 binds the clamp 800 not to move the optical fibers 505 and 506 in a direction apart from the lenses 711 and 712. The fixing nails 830 are nails extending in a direction inside of the clamp 800 and also in a direction of the optical fibers 505 and 506 getting closer to the lenses 711 and 712, and have their tips at a position of pressing the optical fibers 505 and 506 against the optical fiber guides 721 and 722. That is, the fixing nails 830 press the optical fibers 505 and 506 against the optical fiber guides 721 and 722 and also bind the optical fibers 505 and 506 not to move the optical fibers 505 and 506 in a direction apart from the lenses 711 and 712.

As seen above, by the pressing spring 820 and the fixing nails 830, the condition of pressing the optical fibers 505 and 506 against the lenses 711 and 712 is maintained. Depending on to what extent the returning force is given to the pressing spring 820 at the time of manufacture, the force to press the optical fibers 505 and 506 against the lenses 711 and 712 can be adjusted. Further, the spring constant and the displaceable range of the pressing spring 820 may be designed to always allow maintenance of a pressing force at a target value or more reviewing the temperature change and the applied vibration based on the environment of using the optical coupling structure 70. Both methods of Assembly Method 1 and Assembly Method 2 shown in First Embodiment can be used.

According to the optical coupling structure of the present invention, the optical fibers 505 and 506 are positioned by the optical fiber guides 721 and 722 and the fixing nails 830 for a direction vertical to the optical axis. The fixing nails 830 extend in a direction of the optical fibers 505 and 506 getting closer to the lenses 711 and 712, so that as the optical fibers 505 and 506 are about to move in a direction apart from the lenses 711 and 712, it turns out to move together with a clamp 800. Then, as the clamp 800 is about to move, the pressing spring 820 generates a returning force. Accordingly, in a case that the optical fibers 505 and 506 are set to press the lenses 711 and 712 at the time of manufacture, the pressing force is maintained even after the manufacture. Since the optical coupling structure of the present invention is not required to use an adhesive, the assembly steps are simple. Further, since the hoop material can also be used, simple and efficient assembly is possible. It is also allowed to additionally use an adhesive, for example, at the end of the assembly steps. Even in this case, the optical fibers 505 and 506 and the lenses 711 and 712 are fixed by the optical coupling structure of the present invention, so that it is not required to fix the optical fibers 505 and 506 and the lenses 711 and 712 until the adhesive is cured.

[Modification]

Figure 17:
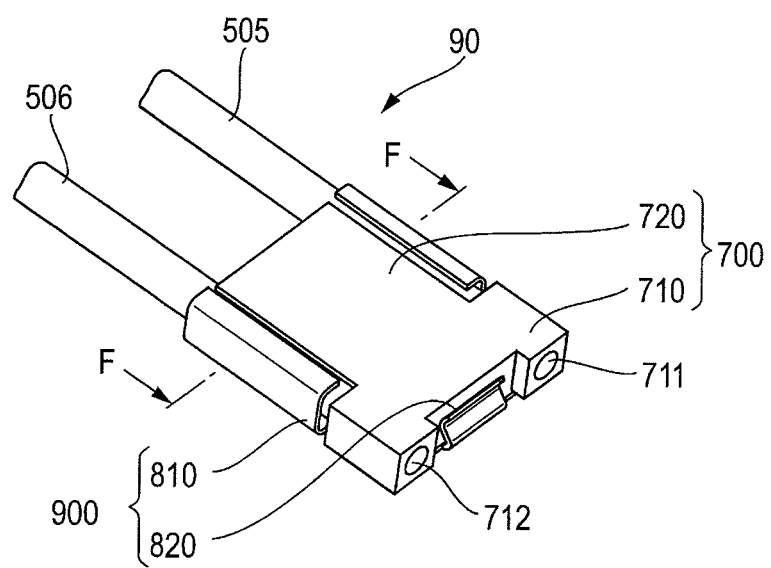
FIG. 17 is a perspective view of an optical coupling structure of a modification of Second Embodiment.
Figure 18:
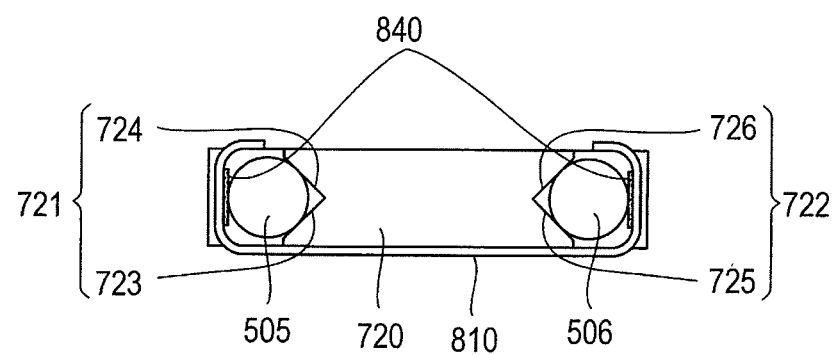
FIG. 18 is a cross-sectional view cut along an F-F line in FIG. 17.
Figure 19:
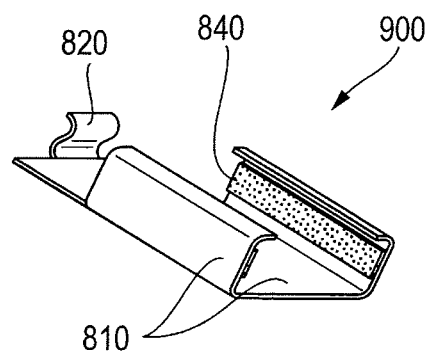
FIG. 19 is a perspective view of a clamp of the modification of Second Embodiment.

FIG. 17 is a perspective view of an optical coupling structure of a modification of Second Embodiment, FIG. 18 is a cross-sectional view cut along an F-F line in FIG. 17, and FIG. 19 is a perspective view of a clamp of the modification of Second Embodiment. An optical coupling structure 90 of the present modification differs from Second Embodiment in modifying the fixing nails 830 of the clamp into rough surfaces 840. That is, the lens body 700 is same as that in Second Embodiment. Then, a clamp 900 is provided with the positioning section 810, the pressing spring 820, and the rough surfaces 840. The rough surfaces 840 are formed in portions of the clamp 900 to press the optical fibers 505 and 506 (in other words, portions facing the optical fiber guides 721 and 722), and are concave and convex surfaces retaining the optical fibers 505 and 506 not to allow moving in a direction apart from the lenses 711 and 712. The rough surfaces 840 may be formed in the clamp 900 by sand blasting or chemical etching. The rough surfaces 840 are concave and convex, so that the friction coefficient between the optical fibers 505 and 506 becomes large. Then, as long as a sufficient frictional force is generated by the force of the clamp 900 pressing the optical fibers 505 and 506, the condition of pressing the optical fibers 505 and 506 against the lenses 711 and 712 can be maintained.

In the assembly of the optical coupling structure 90, the clamp 900 has to be stretched not to allow the rough surfaces 840 to make contact with the optical fibers 505 and 506 when the optical fibers 505 and 506 are inserted, and they have to be in a contact condition after the insertion. For example, in a case of the assembly method described using FIG. 10 in First Embodiment, the insertion step (S120) becomes as follows. In a condition of stretching the clamp 900 not to allow the rough surfaces 840 to make contact with the optical fibers 505 and 506, the optical fibers 505 and 506 are inserted into the optical fiber guides 721 and 722 and the lenses 711 and 712 are pushed with a predetermined force or to a predetermined position using the optical fibers 505 and 506. Then, the condition of stretching the clamp 900 is released to make the rough surfaces 840 contact with the optical fibers 505 and 506 (S120').

The present modification can also be applied to First Embodiment. In a case of the present modification, while the assembly method becomes somewhat complex compared with Second Embodiment, similar effects are obtained and the structure of the clamp 900 becomes simple.

Extraction of Superordinate Concept

Wile Second Embodiment and the modification of Second Embodiment are different in the fixing nails 830 and the rough surfaces 840 of the clamp 800, 900, both of them are common in being formed in the portions to press the optical fibers 505 and 506 of the clamp 800, 900 and retaining the optical fibers 505 and 506 not to allow moving in a direction apart from the lenses 711 and 712. Accordingly, the clamp 800, 900 may be provided with the positioning section, the pressing spring 820, and the retaining section, and the positioning section determines the position of the clamp 800, 900 relative to the lens body 700 except the direction of the optical axes of the optical fibers 505 and 506. The pressing spring 820 makes contact with a surface of the lens body 700 having a matching normal direction with the end faces of the optical fibers 505 and 506, and when the clamp 800, 900 moves in a direction opposite to the normal direction of the surface, it generates a returning force. The retaining section is formed in a portion of the clamp 800, 900 to press the optical fibers 505 and 506 and may retain the optical fibers 505 and 506 not to allow moving in a direction apart from the lenses 711 712. As long as such a clamp 800, 900 is used, the effects of the present invention are obtained.

INDUSTRIAL APPLICABILITY

The present invention is applicable to optically couple an optical fiber and an optical device.

DESCRIPTION OF REFERENCE NUMERALS

10, 30, 70, 90 Optical coupling structure
100, 300, 700 Lens body
110, 310, 710 Lens section
111, 112, 311, 711, 712 Lens
120, 320, 720 Fixing section
121, 122, 321, 721, 722 Optical fiber guide
123, 124, 125, 126, 723, 724, 725, 726 Guide surface
200, 400, 800, 900 Clamp
210, 410, 810 Positioning section
211, 212, 213 Contact section
220, 420, 820 Pressing spring
230, 430, 830 Fixing nail
280 Hoop material
501, 502, 503, 505, 506 Optical fiber
650 Clamp fixing jig
840 Rough surface

What is claimed is:

1. An optical coupling structure, fixing a lens and an end face of an optical fiber in a contact condition, comprising:
   a lens body and a clamp; wherein
   the lens body comprises
   a lens section having the lens, and
   a fixing section formed integrally with the lens section, and having an optical fiber guide, when the optical fiber is pressed, positioning an optical axis of the optical fiber at a predetermined position of the lens, and
   the clamp comprises
   a positioning section determining a position of the clamp relative to the lens body except a position in a direction of the optical axis of the optical fiber,
   a pressing spring making contact with a surface of the lens body having a normal direction matching with the end face of the optical fiber, and generating a returning force when the clamp moves in a direction opposite to the normal direction of the surface, and
   a retaining section formed in a portion of the clamp to press the optical fiber and retaining the optical fiber not to move in a direction apart from the lens.

2. The optical coupling structure according to claim 1, wherein
   the retaining section is a nail extending in a direction inside of the clamp and in a direction of the optical fiber getting closer to the lens and is a fixing nail having its tip at a position pressing the optical fiber against the optical fiber guide.

3. The optical coupling structure according to claim 1, wherein
   the retaining section is a rough surface having concavity and convexity.

4. The optical coupling structure according to claim 1, wherein
   the optical fiber guide comprises two guide surfaces forming a groove to have the optical fiber placed thereon, and the optical axis of the optical fiber is positioned by pressing the optical fiber against both of the two guide surfaces.

5. The optical coupling structure according to claim 1, wherein
   a cross section of the fixing section cut along a surface vertical to the optical axis of the optical fiber is in a rectangular shape with a V shaped groove added thereto,
   the V shaped groove is the optical fiber guide, and
   the positioning section has elasticity and makes contact with three or more surfaces of the fixing section different in normal directions to each other except the V shaped groove.

6. The optical coupling structure according to claim 1, wherein
   the lens body has two lenses and two optical fiber guides, the lens being one of the two lenses, the optical fiber guide being one of the two optical fiber guides.

7. The optical coupling structure according to claim 1, wherein
   the lens body has two lenses and two optical fiber guides, the lens being one of the two lenses, the optical fiber guide being one of the two optical fiber guides,
   a cross section of the fixing section cut along a surface vertical to the optical axis of the optical fiber is in a rectangular shape with respective V shaped grooves added thereto on two facing sides of the rectangle,
   the V shaped grooves are the optical fiber guides,
   the retaining section presses the two optical fibers to sandwich the fixing section, and the positioning section has elasticity and makes contact with at least any one of surfaces of the fixing section without the V shaped grooves.

8. A method of assembling the optical coupling structure, fixing a lens and an end face of an optical fiber in a contact condition, the optical coupling structure comprising:
a lens body and a clamp; wherein
the lens body comprises
a lens section having the lens, and
a fixing section formed integrally with the lens section, and having an optical fiber guide, when the optical fiber is pressed, positioning an optical axis of the optical fiber at a predetermined position of the lens, and
the clamp comprises
a positioning section determining a position of the clamp relative to the lens body except a position in a direction of the optical axis of the optical fiber,
a pressing spring making contact with a surface of the lens body having a normal direction matching with the end face of the optical fiber, and generating a returning force when the clamp moves in a direction opposite to the normal direction of the surface, and
a retaining section formed in a portion of the clamp to press the optical fiber and retaining the optical fiber not to move in a direction apart from the lens,
wherein the retaining section is a nail extending in a direction inside of the clamp and in a direction of the optical fiber getting closer to the lens and is a fixing nail having its tip at a position pressing the optical fiber against the optical fiber guide,
the method comprising:
an attachment step fitting the lens body into the clamp, a portion of which on a side opposite to the pressing spring is connected to a hoop material;
an insertion step inserting the optical fiber into the optical fiber guide and pushing the lens with a predetermined force or to a predetermined position using the optical fiber, and
a cutting step removing the clamp from the hoop material.

9. A method of assembling the optical coupling structure, fixing a lens and an end face of an optical fiber in a contact condition, the optical coupling structure comprising:
a lens body and a clamp; wherein
the lens body comprises
a lens section having the lens, and
a fixing section formed integrally with the lens section, and having an optical fiber guide, when the optical fiber is pressed, positioning an optical axis of the optical fiber at a predetermined position of the lens, and
the clamp comprises
a positioning section determining a position of the clamp relative to the lens body except a position in a direction of the optical axis of the optical fiber,
a pressing spring making contact with a surface of the lens body having a normal direction matching with the end face of the optical fiber, and generating a returning force when the clamp moves in a direction opposite to the normal direction of the surface, and
a retaining section formed in a portion of the clamp to press the optical fiber and retaining the optical fiber not to move in a direction apart from the lens,
wherein the retaining section is a rough surface having concavity and convexity,
the method comprising:
an attachment step fitting the lens body into the clamp, a portion of which on a side opposite to the pressing spring is connected to a hoop material;
an insertion step inserting the optical fiber into the optical fiber guide in a condition of stretching the clamp not to allow the rough surface to make contact with the optical fiber, pushing the lens with a predetermined force or to a predetermined position using the optical fiber, and releasing the condition of stretching the clamp to make the rough surface contact with the optical fiber, and
a cutting step removing the clamp from the hoop material.

10. The optical coupling structure according to claim 2, wherein
the optical fiber guide comprises two guide surfaces forming a groove to have the optical fiber placed thereon, and the optical axis of the optical fiber is positioned by pressing the optical fiber against both of the two guide surfaces.

11. The optical coupling structure according to claim 2, wherein
a cross section of the fixing section cut along a surface vertical to the optical axis of the optical fiber is in a rectangular shape with a V shaped groove added thereto,
the V shaped groove is the optical fiber guide, and
the positioning section has elasticity and makes contact with three or more surfaces of the fixing section different in normal directions to each other except the V shaped groove.

12. The optical coupling structure according to claim 2, wherein
the lens body has two lenses and two optical fiber guides, the lens being one of the two lenses, the optical fiber guide being one of the two optical fiber guides.

13. The optical coupling structure according to claim 2, wherein
the lens body has two lenses and two optical fiber guides, the lens being one of the two lenses, the optical fiber guide being one of the two optical fiber guides,
a cross section of the fixing section cut along a surface vertical to the optical axis of the optical fiber is in a rectangular shape with respective V shaped grooves added thereto on two facing sides of the rectangle,
the V shaped grooves are the optical fiber guides,
the retaining section presses the two optical fibers to sandwich the fixing section, and
the positioning section has elasticity and makes contact with at least any one of surfaces of the fixing section without the V shaped grooves.

14. The optical coupling structure according to claim 3, wherein
the optical fiber guide comprises two guide surfaces forming a groove to have the optical fiber placed thereon, and the optical axis of the optical fiber is positioned by pressing the optical fiber against both of the two guide surfaces.

15. The optical coupling structure according to claim 3, wherein
a cross section of the fixing section cut along a surface vertical to the optical axis of the optical fiber is in a rectangular shape with a V shaped groove added thereto,
the V shaped groove is the optical fiber guide, and
the positioning section has elasticity and makes contact with three or more surfaces of the fixing section different in normal directions to each other except the V shaped groove.

16. The optical coupling structure according to claim 3, wherein the lens body has two lenses and two optical fiber guides, the lens being one of the two lenses, the optical fiber guide being one of the two optical fiber guides.

17. The optical coupling structure according to claim 3, wherein the lens body has two lenses and two optical fiber guides, the lens being one of the two lenses, the optical fiber guide being one of the two optical fiber guides, a cross section of the fixing section cut along a surface vertical to the optical axis of the optical fiber is in a rectangular shape with respective V shaped grooves added thereto on two facing sides of the rectangle, the V shaped grooves are the optical fiber guides, the retaining section presses the two optical fibers to sandwich the fixing section, and the positioning section has elasticity and makes contact with at least any one of surfaces of the fixing section without the V shaped grooves.

* * * * *